UNITED STATES PATENT OFFICE.

JAMES MILLAR NEIL, OF TORONTO, ONTARIO, CANADA, ASSIGNOR TO ALEXANDER M. HAY, OF TORONTO, CANADA.

BINDER OR CEMENTING MATERIAL.

1,030,114. Specification of Letters Patent. Patented June 18, 1912.

No Drawing. Application filed September 5, 1911. Serial No. 647,472.

*To all whom it may concern:*

Be it known that I, JAMES M. NEIL, of Toronto, in the county of York, Province of Ontario, Canada, have invented certain new and useful Improvements in Binder or Cementing Material; and I hereby declare that the following is a full, clear, and exact description thereof.

This invention is an improvement in a binder or cementing material for use in construction work.

Heretofore in the manufacture of bricks, artificial stone, concrete and other construction materials, a solution of silicate of soda has been used as a binding material, and I am aware that silicate of soda has also been used in conjunction with a calcium compound and with sucrose (beet and cane sugar and molasses) for a similar purpose.

I have discovered that a more efficient and economical binder or cementing material can be produced by a mixture of glucose and silicate of soda used in conjunction with a calcium compound, than by the use of sugar or molasses and silicate of soda used in conjunction with a calcium compound. The economy and efficiency of the silicate of soda and glucose mixture are due to the lower cost of glucose, and to its property of rapidly decomposing when exposed to the atmosphere, thereby producing carbon dioxid. The carbon dioxid thus produced combines with the sodium of the silicate of soda forming sodium carbonate, at the same time liberating the silica in a celatinous condition, which, combining with the calcium, forms a true calcium silicate possessing great binding or cementing properties.

My novel binder is made by mixing glucose and silicate of soda with a calcium compound. I preferably mix the ingredients in powdered form in substantially the proportions of one part of glucose to ten parts of silicate of soda, and one part of this mixture to twenty parts of the calcium compound.

On mixing the above described binder with sand, gravel, rock, or other material which it is desired to bind, sufficient water having been added to thoroughly moisten the mass, the above mentioned reactions take place resulting in binding the aggregate into a compact mass of great strength and durability. I have also discovered that a mixture in substantially the same proportions of glucose and silicate of soda in their semi-liquid condition, as generally used in commerce, diluted with water to form a solution having a specific gravity of 30 degrees Twaddell, when added to a calcium carbonate in the proportion of one gallon of solution to 100 pounds of calcium carbonate and mixed with the material which it is desired to bind, gives similar results.

The crushed stone, rock, sand or gravel, are mixed thoroughly with calcium carbonate. The latter for economical reasons may be used in the form of finely divided limestone, in the proportion of two or more parts of the crushed stone, etc., to one part of the finely divided limestone. To the above mixture there is then added a solution composed of glucose and silicate of soda in sufficient quantity to thoroughly moisten the mass, and the whole is again thoroughly mixed either by hand or mechanical means. On allowing this moistened mixture to stand it is found that chemical combination soon commences, heat being generated, and eventually the whole becomes a solid mass of great strength and durability.

The above mentioned solution of glucose and silicate of soda is made as follows: One pound of the thick syrupy commercial glucose is added to ten pounds of the thick syrupy commercial silicate of soda, and sufficient water is added to make a final solution of 30 degrees Twaddell.

The proper quantity of any calcium compound to be used is obtained by calculating the amount of calcium contained in such compound, for example, calcium oxid contains 40 parts of calcium, and 16 parts of oxygen; and calcium carbonate contains 40 parts of calcium, 12 parts of carbon and 48 parts of oxygen; so that if calcium oxid was used 56 parts thereof would be required; and if calcium carbonate was used 100 parts thereof would be required; if it was desired to use 40 parts of calcium in the making of the final mass.

Although I have found the above quantities of glucose and silicate of soda will produce good results, it is obvious that by increasing the amount of glucose final products of greater strength and durability will be produced,—owing to the fact of bringing into active force larger quantities of calcium in the form of soluble bi-carbonate.

What I claim is:

1. A binding material comprising a mixture of silicate of soda and glucose, substantially as described.

2. A material comprising a mixture of silicate of soda and glucose, and a calcium compound, substantially as described.

In testimony that I claim the foregoing as my own, I affix my signature in presence of two witnesses.

JAMES MILLAR NEIL.

Witnesses:
 FRANK E. WILLSHER,
 LAWRENCE J. PASHLER.